(12) United States Patent
Trachewsky (10) Patent No.: US 8,798,565 B2
(45) Date of Patent: *Aug. 5, 2014

(54) RECEIVER WITH HYBRID RECEPTION ESTIMATION AND METHODS FOR USE THEREWITH

(71) Applicant: Broadcom Corporation, Irvine, CA (US)

(72) Inventor: Jason A. Trachewsky, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/903,150

(22) Filed: May 28, 2013

(65) Prior Publication Data

US 2013/0259169 A1     Oct. 3, 2013

Related U.S. Application Data

(63) Continuation of application No. 13/492,488, filed on Jun. 8, 2012, now Pat. No. 8,483,636, which is a continuation of application No. 12/235,452, filed on Sep. 22, 2008, now Pat. No. 8,229,378.

(60) Provisional application No. 61/055,285, filed on May 22, 2008.

(51) Int. Cl.
*H04B 1/00*     (2006.01)

(52) U.S. Cl.
USPC ........... 455/137; 455/133; 455/225; 455/231; 455/500; 455/524

(58) Field of Classification Search
USPC ........... 455/130, 132–140, 168.1, 225, 226.1, 455/230, 231, 500, 502, 506, 509, 524, 526, 455/552.1, 553.1, 334, 323
See application file for complete search history.

(56) References Cited

U.S. PATENT DOCUMENTS

| | | | | |
|---|---|---|---|---|
| 7,302,231 | B2* | 11/2007 | Sun | 455/63.1 |
| 7,412,212 | B2* | 8/2008 | Hottinen | 455/101 |
| 7,583,982 | B2* | 9/2009 | Olesen et al. | 455/562.1 |
| 7,801,248 | B2* | 9/2010 | Challa et al. | 375/316 |
| 7,844,232 | B2* | 11/2010 | Wu et al. | 455/90.3 |
| 8,140,024 | B2* | 3/2012 | Prasad et al. | 455/69 |
| 8,391,390 | B2* | 3/2013 | Ponnampalam et al. | 375/267 |
| 2008/0045154 | A1* | 2/2008 | Wu | 455/65 |
| 2009/0232507 | A1* | 9/2009 | Gupta et al. | 398/115 |
| 2010/0304770 | A1* | 12/2010 | Wietfeldt et al. | 455/509 |
| 2011/0053628 | A1* | 3/2011 | Kim et al. | 455/509 |
| 2011/0092238 | A1* | 4/2011 | Ishibashi et al. | 455/509 |
| 2011/0218016 | A1* | 9/2011 | Hirakawa et al. | 455/524 |

* cited by examiner

*Primary Examiner* — Pablo Tran (74) *Attorney, Agent, or Firm* — Garlick & Markison; Bruce E. Stuckman (57) ABSTRACT

A receiver includes an antenna array that generates received signals from a first remote transmitter and a second remote transmitter, the antenna array having a beam pattern that is controllable based a control signal. A plurality of receiver sections process the received signals to generate down-converted signals. A receiver processing module, generates the control signal to control the beam pattern to a first pattern during a first time period for reception from the first remote transmitter, generates a first reception estimate based on the down-converted signals during the first time period, generates the control signal to control the beam pattern to a second pattern during a second time period for reception from the second remote transmitter, generates a second reception estimate based on the down-converted signals during the second time period, and generates inbound data based on the first reception estimate and the second reception estimate.

20 Claims, 8 Drawing Sheets

RECEIVER WITH HYBRID RECEPTION ESTIMATION AND METHODS FOR USE THEREWITH

CROSS-REFERENCE TO RELATED APPLICATIONS

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:
1. U.S. Utility application Ser. No. 13/492,488, entitled RECEIVER WITH HYBRID RECEPTION ESTIMATION AND METHODS FOR USE THEREWITH, filed Jun. 8, 2012, which claims priority pursuant to 35 U.S.C. §120, as a continuation, to the following U.S. Utility Patent Application which is hereby incorporated herein by reference in its entirety and made part of the present U.S. Utility Patent Application for all purposes:
   a. U.S. Utility application Ser. No. 12/235,452 entitled RECEIVER WITH HYBRID RECEPTION ESTIMATION AND METHODS FOR USE THEREWITH, filed Sep. 22, 2008, issued as U.S. Pat. No. 8,229,378 on Jul. 24, 2012, which claims priority pursuant to 35 U.S.C. §119(e) to the following U.S. Provisional Patent Application which is hereby incorporated herein by reference in its entirety and made part of the present U.S. Utility Patent Application for all purposes:
      i. U.S. Provisional Application Ser. No. 61/055,285, entitled RECEIVER WITH HYBRID RECEPTION ESTIMATION AND METHODS FOR USE THEREWITH, filed May 22, 2008.

The present application is also related to the following U.S. Patent Application: RECEIVER WITH STATISTICAL ANALYSIS AND METHODS FOR USE THEREWITH, having Ser. No. 12/235,439, filed on Sep. 22, 2008.

BACKGROUND OF THE INVENTION

1. Technical Field of the Invention

This invention relates generally to wireless communications systems and more particularly to radio receivers and antenna systems used within such wireless communication systems.

2. Description of Related Art

Communication systems are known to support wireless and wire line communications between wireless and/or wire line communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier (LNA) receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

When a wireless receiver is in the presence of two or more base stations or access points, the reception and analysis of signals can become complex. In addition, decisions relating to handoffs and/or which base station or access point to associate with can be difficult. Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
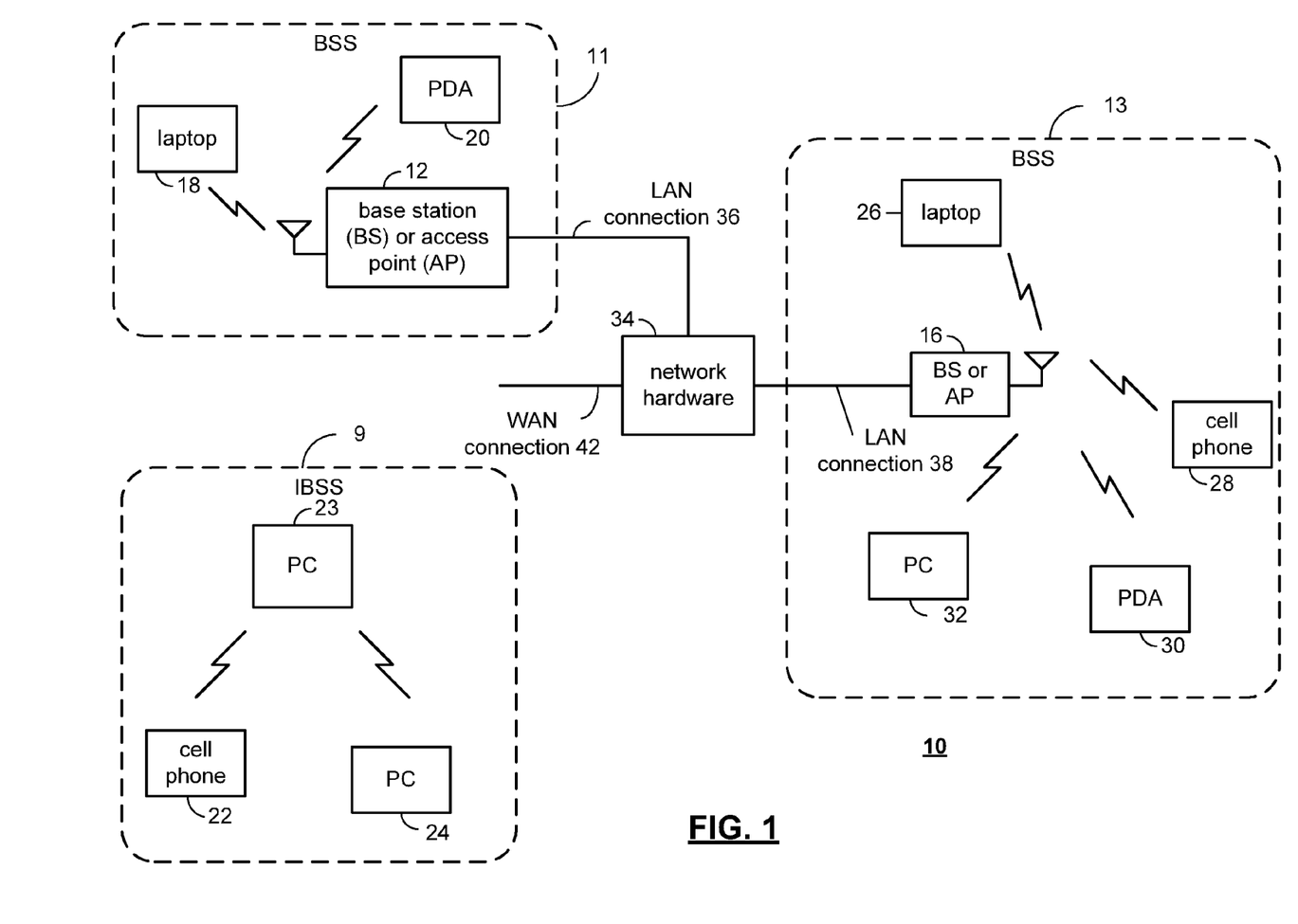
FIG. 1 is a schematic block diagram of a wireless communication system in accordance with an embodiment of the present invention.

FIG. 1 is a schematic block diagram illustrating a communication system 10 that includes a plurality of base stations and/or access points 12, 16, a plurality of wireless communication devices 18-32 and a network hardware component 34. Note that the network hardware 34, which may be a router, switch, bridge, modem, system controller, et cetera provides a wide area network connection 42 for the communication system 10. Further note that the wireless communication devices 18-32 may be laptop host computers 18 and 26, personal digital assistant hosts 20 and 30, personal computer hosts 24 and 32 and/or cellular telephone hosts 22 and 28 that include a wireless transceiver.

Wireless communication devices 22, 23, and 24 are located within an independent basic service set (IBSS) area and communicate directly (i.e., point to point). In this configuration, these devices 22, 23, and 24 may only communicate with each other. To communicate with other wireless communication devices within the system 10 or to communicate outside of the system 10, the devices 22, 23, and/or 24 need to affiliate with one of the base stations or access points 12 or 16.

The base stations or access points 12, 16 are located within basic service set (BSS) areas 11 and 13, respectively, and are operably coupled to the network hardware 34 via local area network connections 36, 38. Such a connection provides the base station or access point 12, 16 with connectivity to other devices within the system 10 and provides connectivity to other networks via the WAN connection 42. To communicate with the wireless communication devices within its BSS 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 10.

Typically, base stations are used for cellular telephone systems and like-type systems, while access points are used for in-home or in-building wireless networks (e.g., IEEE 802.11 and versions thereof, Bluetooth and/or any other type of radio frequency based network protocol). Regardless of the particular type of communication system, each wireless communication device includes a built-in radio and/or is coupled to a radio.

In accordance with an embodiment of the present invention, communication devices 22, 23 and/or 24 include a receiver as will described in conjunction with FIGS. 2-10 that follow.

Figure 2:
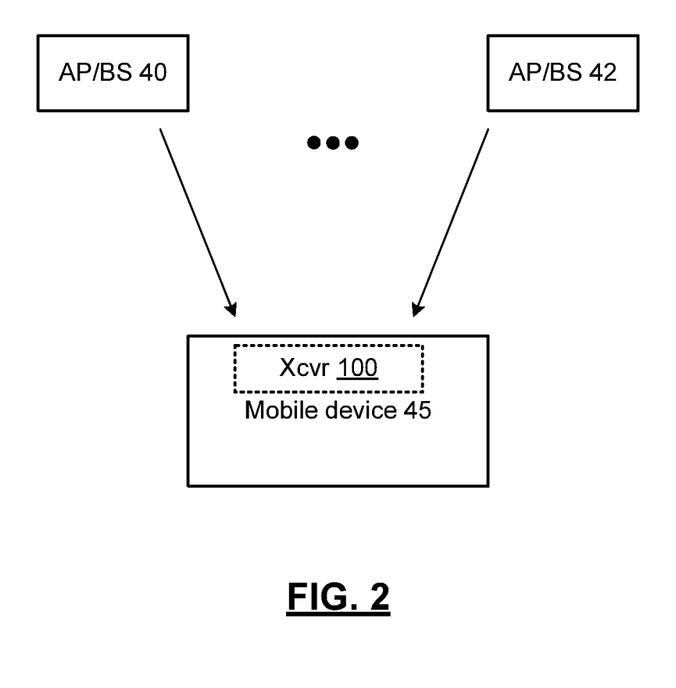
FIG. 2 is a schematic block diagram of a mobile device 45 in accordance with an embodiment of the present invention.

FIG. 2 is a schematic block diagram of a mobile device 45 in accordance with an embodiment of the present invention. In particular, mobile device 45, such as laptop 18, PDA 20, cellphone 22, PC 24, laptop 26, cellphone 28, PDA 30, PC 32 or other mobile communication device, is in range of transmissions from access point/base stations 40 and 42 that may be AP/BS 12 or 16, PC 23 or other remote terminal.

Mobile device 45 includes a transceiver 100 having a transmitter 102 and a receiver 104 that implements one or more function or features of the present invention. In an embodiment of the present invention, the receiver 104 generates a plurality of reception matrices corresponding to the AP/BS 40 and/or the AP/BS 42 based on either beacon signals or other received transmissions. One or more reception statistics are generated from sums based on the reception matrices. The receiver 104 generates an association decision of whether to associate with AP/BS 40 and/or the AP/BS 42, based on these reception statistics.

In another mode of operation, the receiver 104 generates the control signals to control the beam pattern of a phased array antenna system to a first pattern during a first time period for reception from the AP/BS 40. The receiver 104 generates a first reception estimate based on signals received during this first time period. In addition, receiver 104 generates controls the beam pattern to a second pattern during a second time period for reception from the AP/BS/42 and generates a second reception estimate based on signals received during the second time period. In an embodiment of the present invention, the first pattern and second patterns can be chosen to alternatively point the beam to receive signals from one of the remote terminals while attempting to null transmissions for the other terminal, and vice versa. In this fashion, the reception estimates can be calculated in a more straightforward fashion.

The implementation of transceiver 100 including several optional functions and features will be described in greater detail in conjunction with FIGS. 3-10 that follow.

Figure 3:
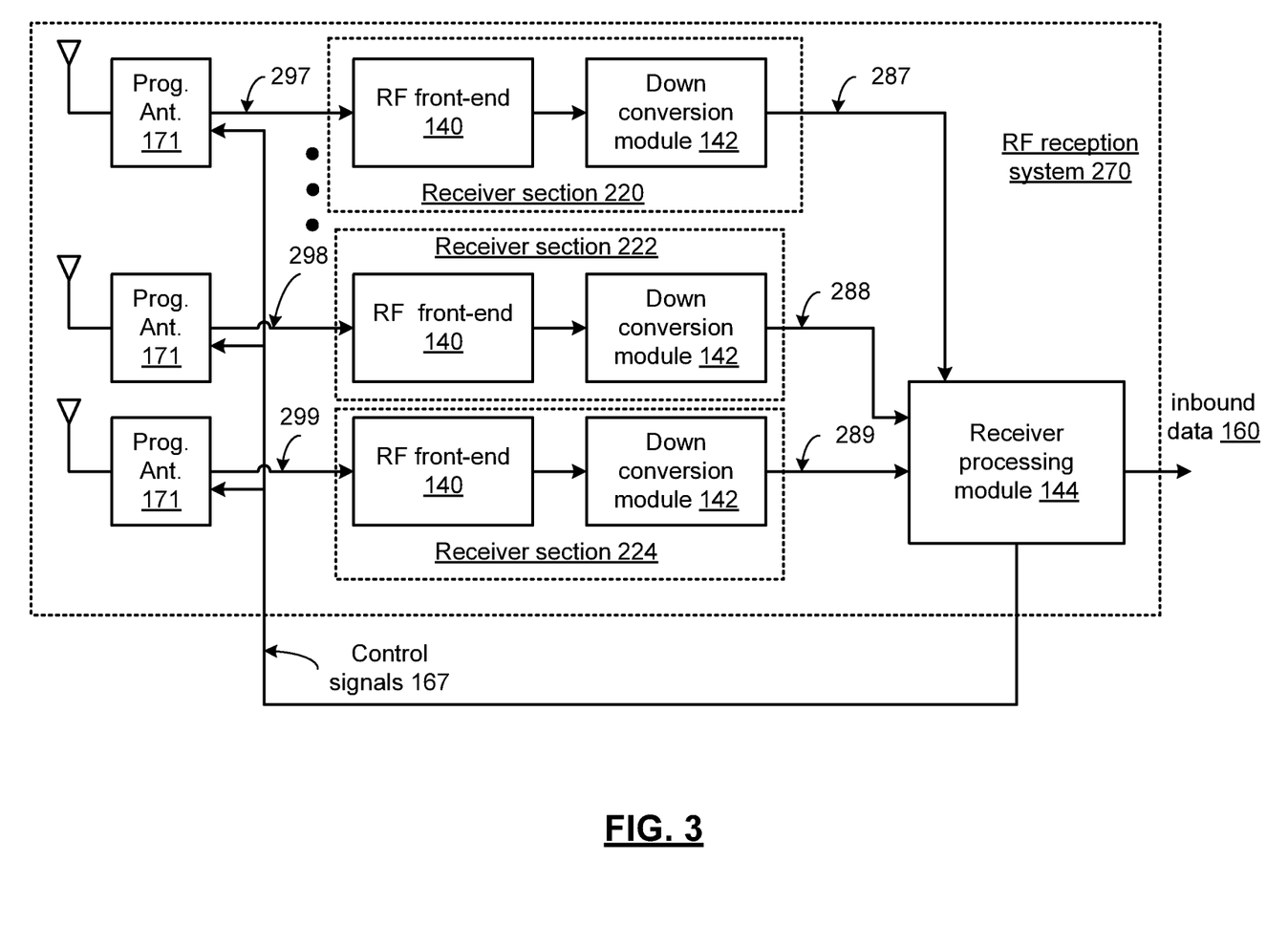
FIG. 3 is a schematic block diagram of an RF reception system 270 in accordance with an embodiment of the present invention.

FIG. 3 is a schematic block diagram of an RF reception system 270 in accordance with an embodiment of the present invention. In particular, RF reception system 270 can be used in transceiver 100 and can include a multiple-input multiple-output (MIMO) antenna structure that has n programmable antennas 171 that are each coupled to n corresponding receiver sections (220, 222, 224). While the RF reception system is shown with n=3, a greater or fewer number can be employed.

Each receiver section (220, 222, 224) receives corresponding inbound RF signals (297, 298, 299) via the antenna structure, that originate from transmissions from one or more wireless communication devices. Each receiver front-end 140 can includes a low noise amplifier, impedance matching and optional filtration. Each down conversion module 142 can include a mixing section, an analog to digital conversion (ADC) module, and may also include a filtering and/or gain module. Each down-conversion module 142 generates a down converted signal (287, 288, 289) such as an analog baseband or low IF signal, based on a receiver local oscillation. The ADC module converts the analog baseband or low IF signal into a digital baseband or low IF signal. The filtering and/or gain module high pass and/or low pass filters the digital baseband or low IF signal to produce the baseband or low IF signal. Note that the ordering of the ADC module and filtering and/or gain module may be switched, such that the filtering and/or gain module is an analog module.

The receiver processing module 144 processes and combines the baseband or low IF signals (287, 288, 289) in accordance with a particular wireless communication standard (e.g., IEEE 802.11, Bluetooth, RFID, GSM, CDMA, et cetera) to produce inbound data 160. The processing performed by the receiver processing module 144 can include, but is not limited to, digital intermediate frequency to baseband conversion, demodulation, demapping, depuncturing, decoding, and/or descrambling. The receiver processing module 144 further generates control signals 167 that control the programmable antennas 171 of the programmable antenna structure 171. In an embodiment of the present invention, the programmable antennas can produce signals with adjustable amplitudes and phases and implement a phased array antenna system. In particular, the antenna structure can have a beam pattern that is controllable based on the control signals 167 produced by receiver processing module 144.

The receiver processing module 144 may be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices.

Such a memory device may be a read-only memory, random access memory, volatile memory, non-volatile memory, static memory, dynamic memory, flash memory, and/or any device that stores digital information. Note that when the receiver processing module 144 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In an embodiment of the present invention, receiver processing module 144 can generates an association decision to determine which of a plurality of remote transmitters such as BS/AP 40, 42, etc. to associate with. In particular, such an association decision can be used when the mobile device 45 initiates wireless communication in the presence two or more access points or base stations or during the hand-off of an ongoing communication. In operation, the receiver processing module 144 generates a first plurality of reception matrices corresponding to a first remote transmitter, such as AP/BS 40 or AP/BS 42 based on the down-converted signals 287, 288 & 289. For example, the receiver processing module 144 generates n×m matrices $H_{1,1}, H_{2,1}, H_{3,1}, \ldots H_{k,1}$, based on a k symbols from each of the n down-converted signals received by observing beacon signals sent by the first remote transmitter, transmissions of the first remote transmitter that are addressed to other wireless devices or other transmissions of the first remote transmitter. In particular, considering a vector corresponding to the kth received signal from a first remote transmitter to be $y_{k,1}$, and the estimated transmitted symbol to be:

$$y_{k,1}=H_{k,1}x_{k,1}$$

Receiver processing module 144 can generate a reception statistic, $C_1$, from a sum based on the reception matrices. For example, $$C_1=\Sigma \log_2(det(I+(\rho H_{i,1}'H_{i,1}/n_1))$$

where the sum is taken i=1 . . . k, I is the identity matrix, det represents the matrix determinant, "'" represents a complex-conjugate (Hermitian) transpose, and $\rho$ is determined by the receiver processing module 144 as the average signal to noise ratio for the n antenna elements.

Receiver processing module 144 can determine to associate with the first remote transmitter if the corresponding reception statistic $C_1$, compares favorably to a reception threshold. In the alternative, the reception statistics $C_i$ for a plurality of remote stations can be calculated. Considering a second remote transmitter, such as AP/BS 40 or 42 the receiver processing module 144 can generate the reception matrices $H_{1,2}, H_{2,2}, H_{3,2}, \ldots H_{k,2}$, based on a k symbols from each of the n down-converted signals received by observing beacon signals sent by the second remote transmitter, transmissions of the second remote transmitter that are addressed to other wireless devices or other transmissions of the second remote transmitter. Receiver processing module 144 can generate a reception statistic, $C_2$, from a sum based on the reception matrices. For example, $$C_2=\Sigma \log_2(det(I+(\rho H_{i,2}'H_{i,2}/n_2))$$

The reception statistics $C_1$ and $C_2$ can be compared and the receiver processing module 144 can generate an association decision to associate with the remote transmitter AP/BS 40, 42, etc. with the most favorable reception statistic. This process can be used by receiver processing module 144 in a similar fashion to calculate and compare the reception statistics for three or more remote transmitters and to generate an association decision based on the remote transmitter with the most favorable reception statistic As discussed above, the receiver processing module 144 generates the control signals 167 to control the beam patterns of the antenna structure. For example, receiver processing module 144 includes a look-up table, algorithm or other control mechanism that selects one or more control signals 167 that operate to control the programmable antennas 171 to produce a controllable antenna pattern with at least one main lobe that can be steered to receive signals from a particular remote station and with one or more nulls that can be aligned to the direction of one or more other stations to attenuate signals from these other stations; see for example, Stuckman and Hill, " Method of Null Steering in Phased Array Antenna Systems," *Electronics Letters*, Vol. 26, No. 15, pp. 1216-1218, Jul. 19, 1990. Directions to each of the remote stations can be mapped by scanning a main lobe and determining the directions to each of the remote stations. The scanning can be repeated periodically based on the motion the mobile device 45 and/or if one or more of the remote transmitters itself is a mobile device. In the alternative, a trial and error methodology can be employed.

In a further example, the receiver processing module 144 controls the antenna beam pattern to facilitate the determination of reception estimates for multiple remote transmitters, such as AP/BS 40, 42 used in generating inbound data 160. Consider the case where receiver processing module 144 relies upon maximum likelihood estimation. The computation of a maximum likelihood estimate from two or more remote transmitters, based on n received signals, can be quite complex. In an embodiment of the present invention, receiver processing module 144 generates a hybrid maximum likelihood estimation by determining separate maximum likelihood estimates for each remote transmitter. The antenna beam pattern is controlled via control signals 167 to cover the first remote transmitter when the maximum likelihood is calculated for this station. Similarly, the antenna beam pattern is controlled via control signals 167 to cover the second remote transmitter when the maximum likelihood is calculated for this other station.

In operation, receiver processing module 144 generates control signals 167 to controls the beam pattern to a first pattern during a first time period for reception from the first remote transmitter, either AP/BS 40 or 42. Receiver processing module 144 generates a first reception estimate, such as a first maximum likelihood estimate, based on the down-converted signals 287. 288, 289 received during the first time period. The receiver processing module 144 then generates control signals 167 to control the beam pattern to a second pattern during a second time period for reception from the second remote transmitter, the other AP/BS 40 or 42, etc. Receiver processing module 144 generates a second reception estimate, such as a second maximum likelihood estimate for this second remote transmitter, based on the down-converted signals 287, 288, 289 during the second time period.

Figure 4:
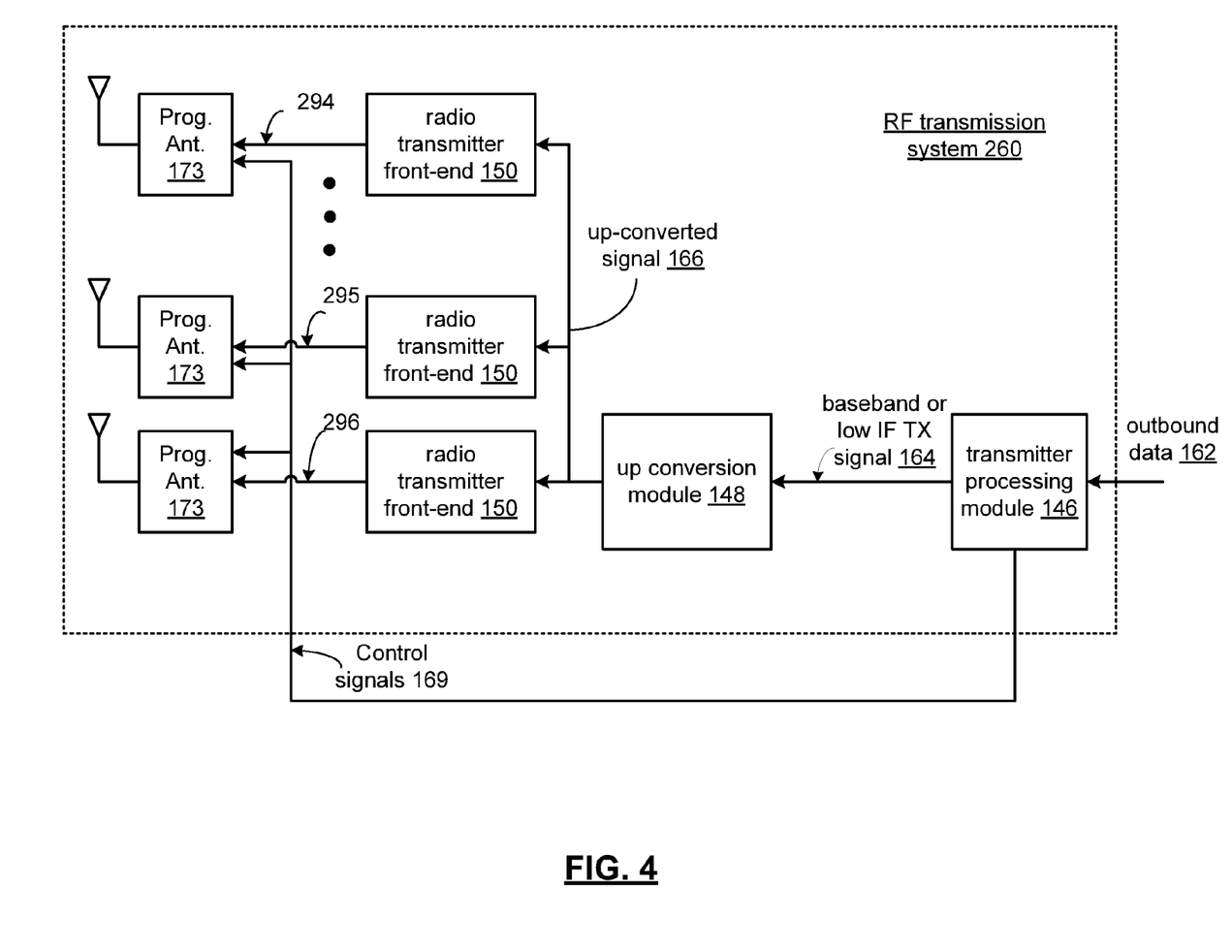
FIG. 4 is a schematic block diagram of an RF transmission system 260 in accordance with an embodiment of the present invention.

FIG. 4 is a schematic block diagram of an RF transmission system 260 in accordance with an embodiment of the present invention. In particular, RF transmission system 260 can be used in transceiver 100 and can include a multiple-input multiple-output (MIMO) antenna structure that has n programmable antennas 171 that are each coupled to n corresponding radio transmitter front-ends 150. While shown with dedicated antenna elements 173, it should be noted that RF transmission system 260 could alternatively share programmable antennas 171 with RF reception system 270 using a plurality of transmit/receive switches, or duplexers/diplexers (not shown). While the RF transmission system 270 is shown with n=3, a greater or fewer number can be employed.

In operation, the RF transmission system 260 receives outbound data 162 from a processor or other source of mobile device 45 via the transmitter processing module 146. The transmitter processing module 146 processes the outbound data 162 in accordance with a particular wireless communication standard (e.g., IEEE 802.11, Bluetooth, RFID, GSM, CDMA, or other wireless telephony protocol, wireless local area network protocol, personal area network protocol, or other wireless protocol) to produce baseband or low intermediate frequency (IF) transmit (TX) signals 164. The baseband or low IF TX signals 164 may be digital baseband signals (e.g., have a zero IF) or digital low IF signals, where the low IF typically will be in a frequency range of one hundred kilohertz to a few megahertz. Note that the processing performed by the transmitter processing module 146 can include, but is not limited to, scrambling, encoding, puncturing, mapping, modulation, and/or digital baseband to IF conversion.

Further note that the transmitter processing module 146 may be implemented using a shared processing device (such as a processing device used in the implementation of receiver processing module 144), individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the transmitter processing module 146 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

The up conversion module 148 includes a digital-to-analog conversion (DAC) module, a filtering and/or gain module, and a mixing section. The DAC module converts the baseband or low IF TX signals 164 from the digital domain to the analog domain. The filtering and/or gain module filters and/or adjusts the gain of the analog signals prior to providing it to the mixing section. The mixing section converts the analog baseband or low IF signals into up converted signals 166 based on a transmitter local oscillation.

Each radio transmitter front end 150 includes a power amplifier 84 and may also include a transmit filter module. The power amplifier amplifies the up converted signals 166 to produce outbound RF signals 170, which may be filtered by the transmitter filter module, if included. The programmable antenna 173 transmits the outbound RF signals 170 to a targeted device such as AP/BS (40, 42) and/or another wireless communication device.

In an embodiment of the present invention, transmitter processing module 146 is further operable to control the bean pattern of the antenna structure in a similar fashion to receiver processing module 144. When the antenna structure of RF transmission system 260 shares the programmable antennas 171, control signals 169, such as control signals 167, can be generated by transmitter processing module 260 during periods of transmission and control signals 167 can be generated by receiver processing module 144 during periods of reception.

Figure 5:
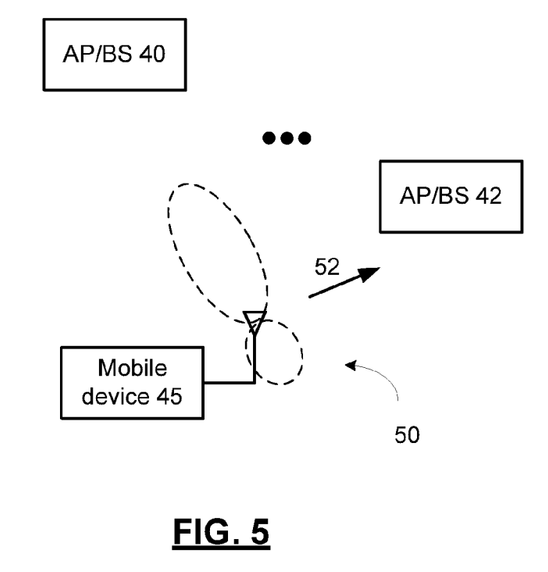
FIG. 5 is a schematic block diagram of an embodiment of a mobile device 45 in a mode of operation in accordance with the present invention.

FIG. 5 is a schematic block diagram of an embodiment of a mobile device 45 in a mode of operation in accordance with the present invention. In a mode of operation discussed in conjunction with FIG. 3, the antenna beam pattern 50 is controlled via control signals 167 to cover the AP/BS 40 when a reception estimate, such as maximum likelihood estimate, is calculated by receiver processing module 144 for this station. As shown, antenna beam pattern 50 includes a null in direction 52 corresponding to the AP/BS 42 and includes a lobe in the direction corresponding to the AP/BS 40. This antenna beam pattern serves to facilitate the reception of transmission from AP/BS 40 while attenuating transmissions from AP/BS 42 to simplify the computation of the reception estimate. While an example beam pattern is shown, other beam patterns could likewise be employed, based on the number and configuration of the individual antenna elements, the individual reception patterns, etc.

Figure 6:
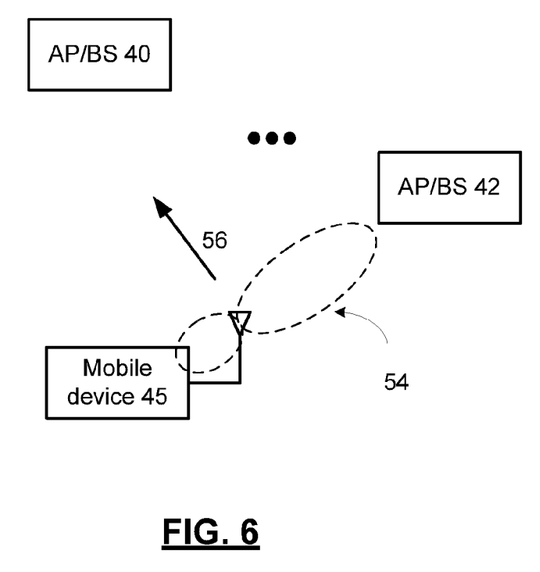
FIG. 6 is a schematic block diagram of an embodiment of a mobile device 45 in another mode of operation in accordance with the present invention.

FIG. 6 is a schematic block diagram of an embodiment of a mobile device 45 in another mode of operation in accordance with the present invention. In another mode of operation discussed in conjunction with FIG. 3, the antenna beam pattern 54 is controlled via control signals 167 to cover the AP/BS 42 when a reception estimate, such as maximum likelihood estimate, is calculated by receiver processing module 144 for this station. As shown, antenna beam pattern 54 includes a null in direction 56 corresponding to the AP/BS 40 and includes a lobe in the direction corresponding to the AP/BS 40. This antenna beam pattern serves to facilitate the reception of transmission from AP/BS 42 while attenuating transmissions from AP/BS 40 to simplify the computation of the reception estimate. While an example beam pattern is shown, other beam patterns could likewise be employed, based on the number and configuration of the individual antenna elements, the individual reception patterns, etc.

Figure 7:
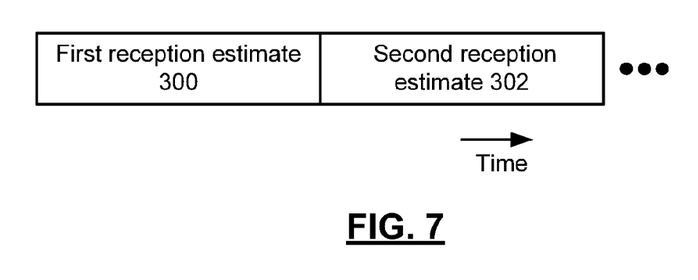
FIG. 7 is a temporal diagram in accordance with an embodiment of the present invention.

FIG. 7 is a temporal diagram in accordance with an embodiment of the present invention.

In particular, separate time periods are shown corresponding to a first reception estimate 300 and second reception estimate 302. As previously discussed, the antenna structure is controlled to different beam patterns during these individual periods to facilitate the computation of reception estimates such as a hybrid maximum likelihood estimate that is based on individual estimates calculated for two or more remote transmitters such as AP/BS 40, 42, etc. While these time periods 300 and 302 are shown as contiguous, an intervening time period could likewise be included. Further, while separate periods of data reception are required at two different antenna beam patterns, computation of a reception estimate can take place for a first remote transmitter, in a pipelined fashion, while data is collected for a second remote transmitter, etc.

Figure 8:
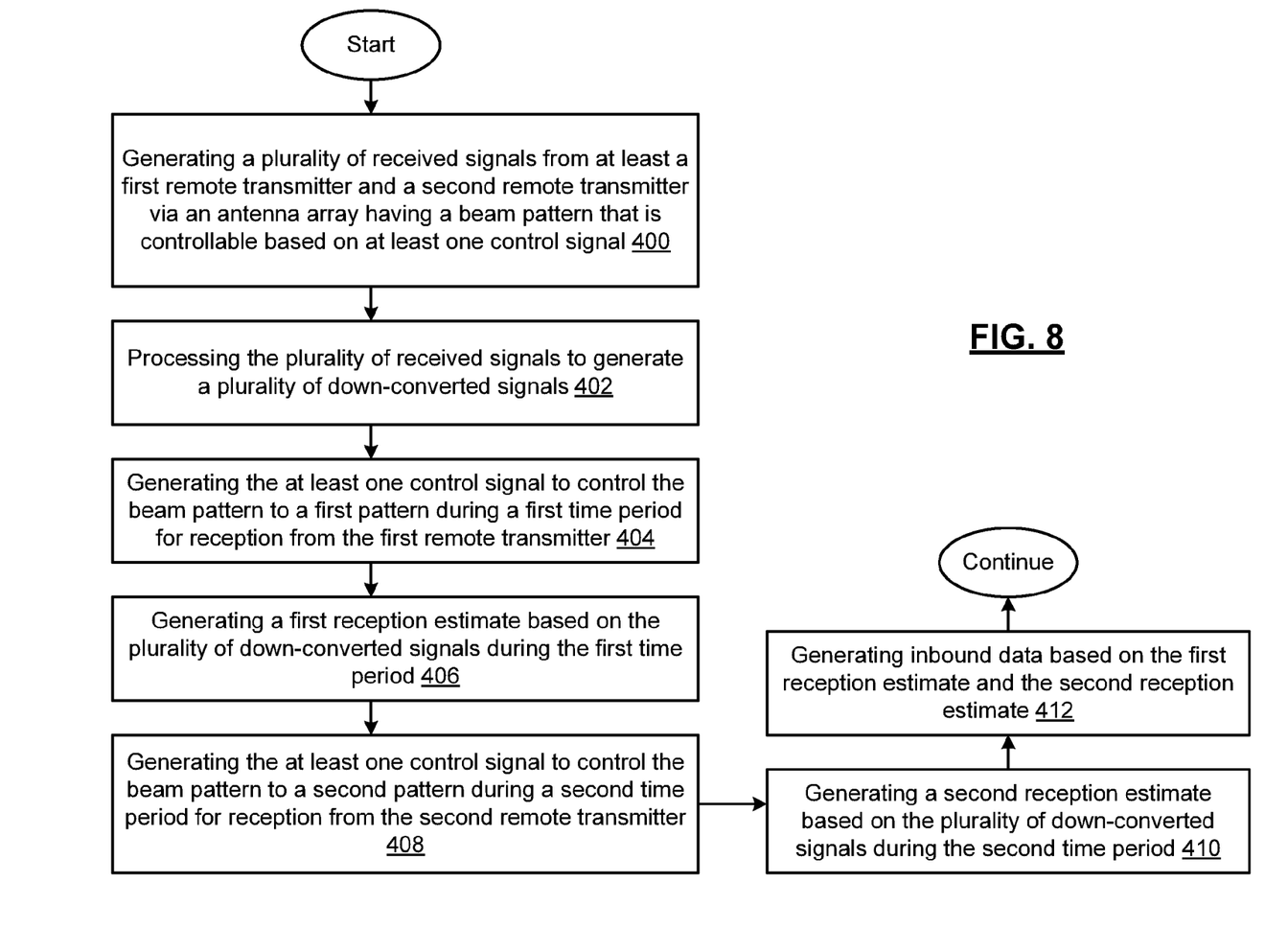
FIG. 8 is a flow chart representation of a method in accordance with an embodiment of the present invention.

FIG. 8 is a flowchart representation of a method in accordance with an embodiment of the present invention. In particular a method is presented for use with one or more features or functions presented in conjunction with FIGS. 1-7. In step 400, a plurality of received signals are generated from at least a first remote transmitter and a second remote transmitter via an antenna array having a beam pattern that is controllable based on at least one control signal. In step 402, the plurality of received signals are processed to generate a plurality of down-converted signals. In step 404, the at least one control signal is generated to control the beam pattern to a first pattern during a first time period for reception from the first remote transmitter. In step 406, a first reception estimate is generated based on the plurality of down-converted signals during the first time period. In step 408, the at least one control signal is generated to control the beam pattern to a second pattern during a second time period for reception from the second remote transmitter. In step 410, a second reception estimate is generated based on the plurality of down-converted signals during the second time period. In step 412, inbound data is generated based on the first reception estimate and the second reception estimate.

In an embodiment of the present invention, the received signals are formatted in accordance with a wireless telephony protocol. The first remote transmitter can correspond to a first base station and the second remote transmitter can correspond to a second base station. The first pattern can includes a null in a direction corresponding to the second remote transmitter and a lobe in a direction corresponding to the first remote transmitter. The second pattern can include a null in a direction corresponding to the first remote transmitter and a lobe in a direction corresponding to the second remote transmitter. The first reception estimate can be a maximum likelihood estimate corresponding to the first remote transmitter. The second reception estimate can be a maximum likelihood estimate corresponding to the second remote transmitter.

Figure 9:
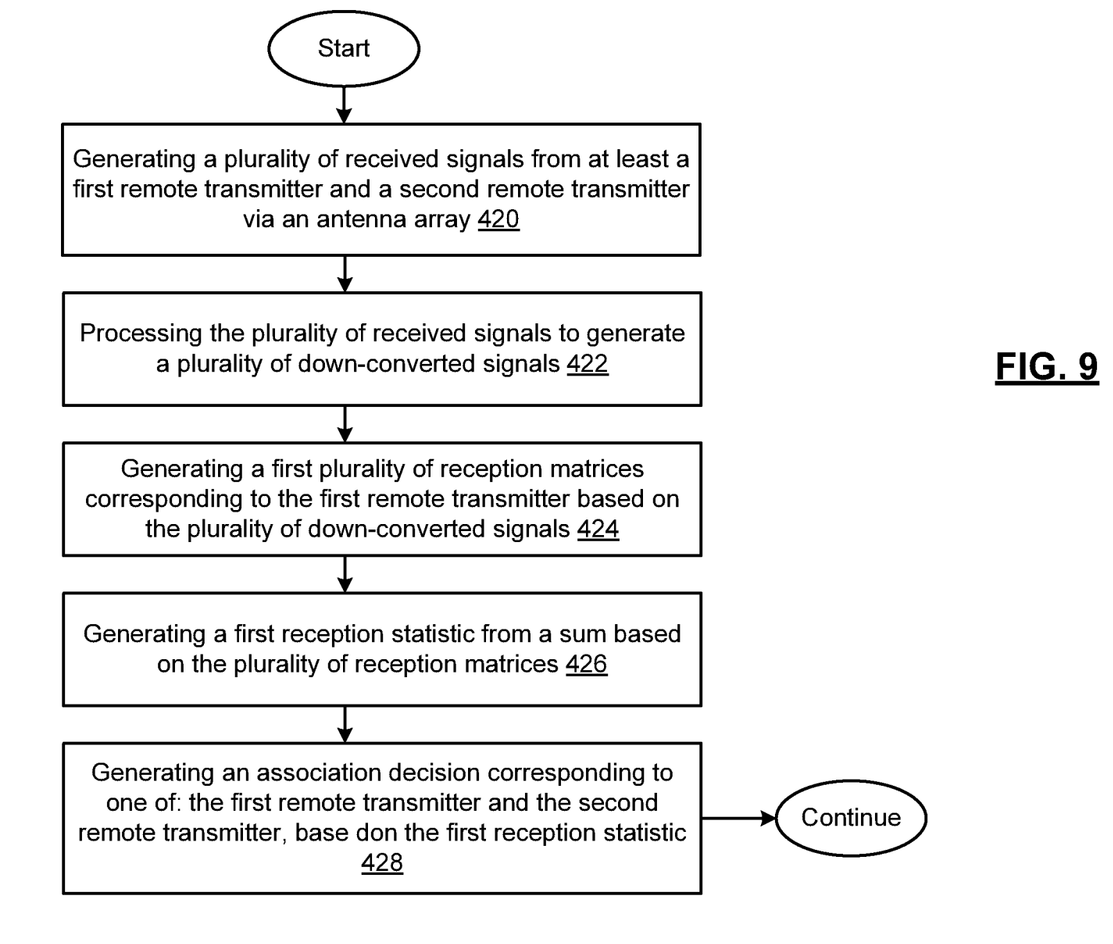
FIG. 9 is a flow chart representation of a method in accordance with an embodiment of the present invention.

FIG. 9 is a flowchart representation of a method in accordance with an embodiment of the present invention. In particular a method is presented for use with one or more features or functions presented in conjunction with FIGS. 1-8. In step 420, a plurality of received signals are generated via an antenna array from at least a first remote transmitter and a second remote transmitter. In step 422, the plurality of received signals are processed to generate a plurality of down-converted signals. In step 424, a first plurality of reception matrices are generated corresponding to the first remote transmitter, based on the plurality of down-converted signals. In step 426, a first reception statistic is generated from a sum based on the first plurality of reception matrices. In step 428, an association decision is generated corresponding to one of: the first remote transmitter and the second remote transmitter, based on the first reception statistic.

In an embodiment of the present invention, the received signals are formatted in accordance with a wireless local area network protocol. The first remote transmitter can correspond to a first access point and the second remote transmitter can correspond to a second access point. The plurality of received signals can include at least one beacon transmission of the first remote transmitter and the first plurality of reception matrices can be generated in response to the beacon transmission. The plurality of received signals can include at least one transmission addressed to a remote receiver and the first plurality of reception matrices can be generated in response to the at least one transmission. The first plurality of reception matrices can be N×M matrices, where N is a number of the plurality of received signals and M is the number of transmitter array antenna elements. The sum can be based on an average antenna signal to noise ratio and a number of antennas in the antenna array. The sum can be proportional to a sum of $\log_2(\det(I+(\rho\, H_{i,1}'H_{i,1}/m_1)))$, where $i=1\ldots k$; $H_{i,1}$ represents each of the first plurality of reception matrices; $\rho$ represents an average antenna signal to noise ratio; n represents a number of antennas in the antenna array; "'" represents a complex-conjugate (Hermitian) transpose, and I represents an identity matrix.

Figure 10:
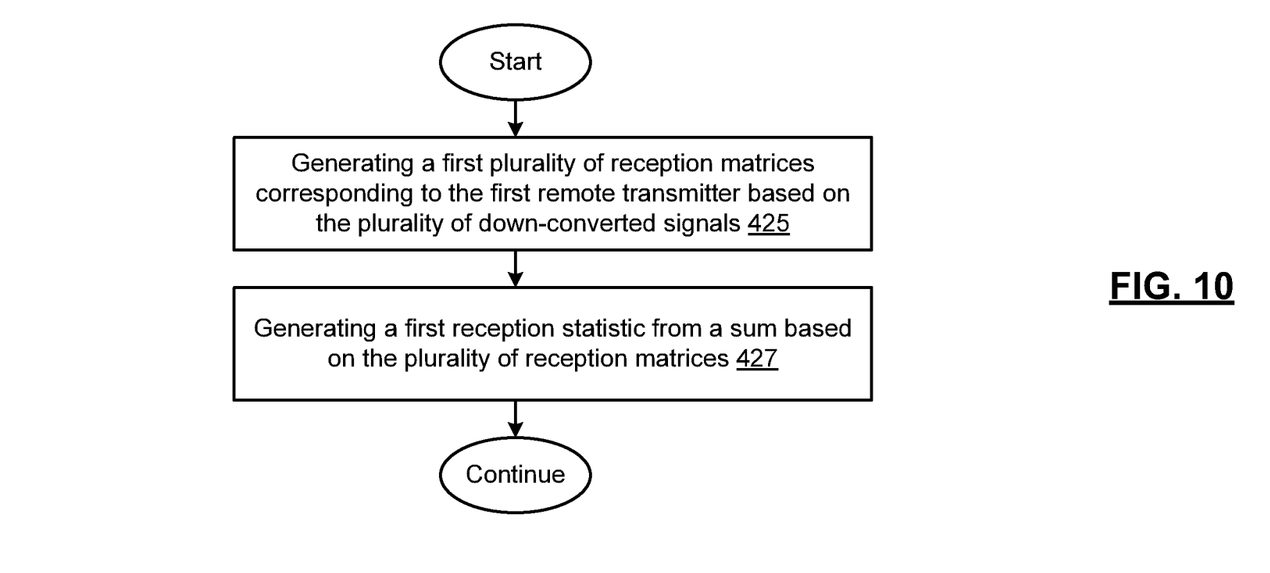
FIG. 10 is a flow chart representation of a method in accordance with an embodiment of the present invention.

FIG. 10 is a flowchart representation of a method in accordance with an embodiment of the present invention. In particular a method is presented for use with one or more features or functions presented in conjunction with FIG. 9. In step 425, a second plurality of reception matrices are generated corresponding to the second remote transmitter, based on the plurality of down-converted signals. In step 427, a second reception statistic is generated from a sum based on the second plurality of reception matrices. In addition, step 408 can be based on a comparison of the first reception statistic and the second reception statistic.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A receiver for use in a base station, the receiver comprising:
    an antenna array that generates a plurality of received signals from at least a first remote transmitter and a second remote transmitter, the antenna array having a plurality of individual antennas for forming a beam pattern that is controllable based on at least one control signal;
    a plurality of receiver sections, coupled to the antenna array, that process the plurality of received signals to generate a plurality of down-converted signals;
    a receiver processing module, coupled to the plurality of receiver sections, that:
        generates the at least one control signal to control the beam pattern to a first pattern for reception from the first remote transmitter and that generates a first reception estimate based on the plurality of down-converted signals during a first time period;
        generates the at least one control signal to control the beam pattern to a second pattern for reception from the second remote transmitter and that generates a second reception estimate based on the plurality of down-converted signals during a second time period; and
    generating inbound data based on the first reception estimate and the second reception estimate.

2. The receiver of claim 1 wherein the receiver is implemented in a multi-input multi-output transceiver.

3. The receiver of claim 1 wherein the received signals are formatted in accordance with a wireless telephony protocol.

4. The receiver of claim 3 wherein the first remote transmitter corresponds to a first base station and the second remote transmitter corresponds to a base station.

5. The receiver of claim 1 wherein the first pattern includes a null in a direction corresponding to the second remote transmitter.

6. The receiver of claim 1 wherein the first pattern includes a main lobe in a direction corresponding to the first remote transmitter.

7. The receiver of claim 1 wherein the second pattern includes a null in a direction corresponding to the first remote transmitter.

8. The receiver of claim 1 wherein the second pattern includes a main lobe in a direction corresponding to the second remote transmitter.

9. The receiver of claim 1 wherein the first reception estimate is a maximum likelihood estimate corresponding to the first remote transmitter.

10. The receiver of claim 1 wherein the second reception estimate is a maximum likelihood estimate corresponding to the second remote transmitter.

11. A method comprising:
    generating a plurality of received signals from at least a first remote transmitter and a second remote transmitter via an antenna array having a plurality of individual antennas for forming a beam pattern that is controllable based on at least one control signal;
    processing the plurality of received signals to generate a plurality of down-converted signals;
    generating the at least one control signal to control the beam pattern to a first pattern for reception from the first remote transmitter;
    generating a first reception estimate based on the plurality of down-converted signals during a first time period;
    generating the at least one control signal to control the beam pattern to a second pattern for reception from the second remote transmitter;
    generating a second reception estimate based on the plurality of down-converted signals during a second time period; and
    generating inbound data based on the first reception estimate and the second reception estimate.

12. The method of claim 11 wherein the received signals are formatted in accordance with a wireless networking protocol.

13. The method of claim 12 wherein the first remote transmitter corresponds to a first base station and the second remote transmitter corresponds to a second base station.

14. The method of claim 11 wherein the first pattern includes a null in a direction corresponding to the second remote transmitter.

15. The method of claim 11 wherein the first pattern includes a main lobe in a direction corresponding to the first remote transmitter.

16. The method of claim 11 wherein the second pattern includes a null in a direction corresponding to the first remote transmitter.

17. The method of claim 11 wherein the second pattern includes a main lobe in a direction corresponding to the second remote transmitter.

18. The method of claim 11 wherein the first reception estimate is a maximum likelihood estimate corresponding to the first remote transmitter.

19. The method of claim 11 wherein the second reception estimate is a maximum likelihood estimate corresponding to the second remote transmitter.

20. A receiver for use in a multi-input multi-output (MIMO) transceiver comprising:
- an antenna array, coupled to the MIMO transceiver, that generates a plurality of received signals from at least a first remote transmitter and a second remote transmitter, the antenna array having a plurality of individual antennas for forming a beam pattern that is controllable based on at least one control signal;
- a plurality of receiver sections, coupled to the antenna array, that process the plurality of received signals to generate a plurality of down-converted signals;
- a receiver processing module, coupled to the plurality of receiver sections, that:
  - generates the at least one control signal to control the beam pattern to a first pattern for reception from the first remote transmitter and that generates first reception data based on the plurality of down-converted signals during a first time period;
  - generates the at least one control signal to control the beam pattern to a second pattern for reception from the second remote transmitter and that generates a second reception data based on the plurality of down-converted signals during a second time period; and
  - generating inbound data based on the first reception data and the second reception data.

* * * * *

UNITED STATES PATENT AND TRADEMARK OFFICE
CERTIFICATE OF CORRECTION

PATENT NO. : 8,798,565 B2  Page 1 of 1
APPLICATION NO. : 13/903150
DATED : August 5, 2014
INVENTOR(S) : Jason A. Trachewsky It is certified that error appears in the above-identified patent and that said Letters Patent is hereby corrected as shown below:

In the Claims

Col. 12, line 3, in claim 4: after "corresponds to a" insert --second--

Signed and Sealed this
Fifteenth Day of September, 2015

Michelle K. Lee
*Director of the United States Patent and Trademark Office*